US009747129B2

(12) United States Patent
Osborne et al.

(10) Patent No.: US 9,747,129 B2
(45) Date of Patent: Aug. 29, 2017

(54) METHODS AND SYSTEMS FOR STARTING COMPUTERIZED SYSTEM MODULES

(71) Applicant: International Business Machines Corporation, Armonk, NY (US)

(72) Inventors: Michael Charles Osborne, Rueschlikon (CH); Elaine Rivette Palmer, Hanover, NH (US); Tamas Visegrady, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 14/919,892

(22) Filed: Oct. 22, 2015

(65) Prior Publication Data

US 2016/0117189 A1 Apr. 28, 2016

(30) Foreign Application Priority Data

Oct. 23, 2014 (GB) ..................................... 1418870

(51) Int. Cl.
*G06F 9/48* (2006.01)
(52) U.S. Cl.
CPC .............. *G06F 9/48* (2013.01); *G06F 9/4881* (2013.01); *G06F 2209/484* (2013.01)
(58) Field of Classification Search
CPC ........................................................ G06F 9/48
See application file for complete search history.

(56) References Cited

U.S. PATENT DOCUMENTS

| 8,332,632 | B2 | 12/2012 | Iftode et al. | |
|---|---|---|---|---|
| 2006/0195828 | A1* | 8/2006 | Nishi | G06F 8/456 717/140 |
| 2006/0259673 | A1* | 11/2006 | Bancel | G06F 11/28 710/110 |

(Continued)

FOREIGN PATENT DOCUMENTS

| CN | 102986163 A | 3/2013 |
|---|---|---|
| WO | 2011109772 A2 | 9/2011 |

OTHER PUBLICATIONS

Bosilca, DAGuE, Fig 1 marked up, Parallel Computing, 2012.*

(Continued)

*Primary Examiner* — Charlie Sun
(74) *Attorney, Agent, or Firm* — Harrington & Smith (57) ABSTRACT

Graph data of a DAG is received. The data describes a module to be started by way of nodes connected by edges, wherein some nodes are submodule nodes that correspond to submodules of said module. Submodule nodes are connected via edge(s) that reflect a data dependency between the corresponding submodules. Each of said submodules is a hardware module or a software submodule, capable of producing and/or consuming data that can be consumed and/or produced, by other submodule(s) of said module, based on the DAG. Asynchronous execution is started of two of said submodules, respectively corresponding to two submodule nodes located in independent branches of the DAG. A third submodule node(s) is determined that is a descendant of each of said two submodule nodes, according to an outcome of the execution of the corresponding two submodules. Execution is started of a third submodule that corresponds to the determined third submodule node.

20 Claims, 4 Drawing Sheets

(56) References Cited

U.S. PATENT DOCUMENTS

| | | | |
|---|---|---|---|
| 2006/0294507 A1 | 12/2006 | Buskens et al. | |
| 2007/0088630 A1 | 4/2007 | MacLeod et al. | |
| 2008/0244588 A1 | 10/2008 | Leiserson et al. | |
| 2009/0204964 A1 | 8/2009 | Foley et al. | |
| 2011/0173643 A1 | 7/2011 | Nicolson et al. | |
| 2013/0031531 A1* | 1/2013 | Keynes | G06F 8/74 717/126 |
| 2013/0117752 A1* | 5/2013 | Li | G06F 9/5066 718/102 |
| 2014/0025939 A1 | 1/2014 | Smith et al. | |
| 2014/0047445 A1 | 2/2014 | Roy et al. | |
| 2014/0297833 A1* | 10/2014 | Bedini | H04L 43/0876 709/224 |
| 2016/0283610 A1* | 9/2016 | Simitsis | G06F 17/30958 |

OTHER PUBLICATIONS

W. Xu et al.; "DR@FT: Efficient Remote Attestation Framework for Dynamic Systems"; 2010; URL: http://www.cis.desu.edu/~hhu/papers/ESORICS10.pdf; whole document (16 pages).

P. Yau et al.; "Enhancing Grid Security Using Workflows, Trusted Computing and Virtualisation"; Proceedings of the 2009 International Conference on Grid Computing & Applications, GCA 2009; Jul. 13-16, 2009; Las Vegas, Nevada, USA; whole document (7 pages).

P. Yau et al.; "Securing Grid Workflows with Trusted Computing"; [CCS 2008; Part III, LNCS 5103; pp. 510-519.

Bosilca, G. et al.; "DAGuE: A generic distributed DAG engine for high performance computing"; Parallel Computing 38(1-2): 37-51; 2012; whole document (11 pages).

Ballard, G. et al.; "Graph Expansion Analysis for Communication Costs of Fast Rectangular Matrix Multiplication"; Technical Report No. UCB/EECS-2012-194, Electrical Engineering and Computer Sciences Department, University of California at Berkeley; Sep. 10, 2012; whole document (20 pages).

Bertoni, G. et al.; "Sakura: a flexible coding for tree hashing"; Cryptology ePrint Archive, Report 2013/231; 2013; eprint.iacr.org/2013/231; whole document (18 pages).

Black, J.; "Compare-by-Hash: A Reasoned Analysis"; USENIX Annual Technical Conference, General Track; 2006; pp. 85-90.

Corbet, J.; "The road forward for systemd"; Online at lwn.net/Articles/389149; May 2010 (accessed Nov. 15, 2013); whole document (2 pages).

Dongarra, J.; "Architecture-aware Algorithms and Software for Peta and Exascale Computing"; Presentation at Supercomputing 2013 (SC13), Denver, Colorado; Nov. 2013; whole document (49 pages).

National Institute of Standards and Technology (NIST); "Federal Information Processing Standards Publication: Security Requirements for Cryptographic Modules (FIPS PUB 140-2)"; May 25, 2001; whole document (69 pages).

International Standard ISO/IEC 23360-1:2006; "Linux Standard Base (LSB) core specification 3.1—Part 1: Generic specification"; Dec. 15, 2006; whole document (472 pages).

Mahkovec, Z.; "Bootchart—Boot Process Performance Visualization"; Online at bootchart.org; 2005 (accessed Nov. 21, 2013; whole document (8 pages).

McGrath, R.; "Fedora Project: Add BuildID Support"; Online at fedoraproject.org/wiki/Releases/FeatureBuildId; Oct. 2007 (accessed Nov. 18, 2013); whole document (7 pages).

Poettering, L. et al.; "Control Centre: The systemd Linux init system"; Online at h-online.com/-1565543; May 2012 (accessed Nov. 17, 2013); whole document (9 pages).

Ryzhyk, L. et al.; "Automatic Device Driver Synthesis with Termite"; Proceedings of the 22nd ACM Symposium on Operating Systems Principles (SOSP); 2009; whole document (18 pages).

Safford, D.; "Embedded Linux Integrity"; Proceedings of the Linux Security Summit (LSS 2013); Jun. 2013; whole document (8 pages).

Trusted Computing Group; Trusted Platform Module (TPM) Specification, Part 1 Design Principles (Specification Version 1.2, Revision 116); Mar. 1, 2011; whole document (184 pages).

Treinen, R. et al.; "Expressing Advanced User Preferences in Component Installation"; Proceedings of IWOCE'2009: 1st International Workshop on Open Component Ecosystems; Sep. 2009; whole document (10 pages).

Yee, B. et al.; "Native Client: A Sandbox for Portable, Untrusted x86 Native Code"; IEEE Symposium on Security and Privacy (Oakland'09); 2009; whole document (15 pages).

* cited by examiner

METHODS AND SYSTEMS FOR STARTING COMPUTERIZED SYSTEM MODULES

CROSS-REFERENCE TO RELATED APPLICATIONS

The present application claims the benefit under 35 U.S.C. §119, and any other applicable laws, of application number 1418870.0, filed in GB on Oct. 23, 2014, the disclosure of which is hereby incorporated by reference in its entirety.

FIELD OF THE INVENTION

The invention relates in general to the field of computer-implemented methods and systems for starting modules of a computerized system. In particular, it may find applications notably in processes of configuration tracking for composite systems in high-assurance environments.

BACKGROUND OF THE INVENTION

Tracking exact configurations of composite systems is needed in high-assurance environments, to unambiguously identify aggregate system states. Solutions based on cryptographic hash functions are widely used. Such solutions, however, are inflexible inasmuch as they do not describe any non-determinism aspects of the context, such as uncoordinated completions of unrelated computerized submodules of the system, even if all the final states of the submodules would be individually accepted by the system. This problem is prevalent in high-assurance security systems, environments requiring reliable auditing, compliance-tracking, or configuration management.

BRIEF SUMMARY OF THE INVENTION

In an exemplary embodiment, a computer-implemented method is disclosed for starting a module of a computerized system. The method includes receiving graph data of a direct acyclic graph, or DAG, describing said module by way of nodes connected by edges. At least part of the nodes are submodule nodes that correspond to submodules of said module, respectively. Submodule nodes are connected via one or more edges that reflect a data dependency between the corresponding submodules. Each of said submodules is a hardware module or a software submodule, capable of producing and/or consuming data that can, in turn, be consumed and/or produced, respectively, by one or More other submodules of said module, consistently with edges of the DAG. The method also includes starting asynchronous execution of two of said submodules, respectively corresponding to two submodule nodes located in independent branches of the DAG. The method further includes determining at least a third submodule node that is a descendant of each of said two submodule nodes, according to an outcome of the execution of one or each of the corresponding two submodules, and starting execution of a third submodule that corresponds to the third submodule node determined, in view of completing the starting of said module.

According to another exemplary embodiment, a computer-implemented method is disclosed for creating graph data of a direct acyclic graph, or DAG, describing a module of a computerized system, by way of nodes connected by edges. The method includes using a known description of the computerized system to create said graph data of the DAG. At least part of the nodes are submodule nodes that correspond to submodules of said module, respectively, the DAG further comprising one or more control nodes, which correspond to control structures and connect, each, one or more ancestor submodule nodes to one or more descendant submodule nodes. Submodule nodes are connected via one or more edges that reflect a data dependency between the corresponding submodules. Each of said submodules is a hardware module and/or software submodule, capable of producing and/or consuming data that can, in turn, be consumed and/or produced, respectively, by one or more other submodules of said module, consistently with edges of the DAG. The method further comprises computing expected values corresponding to an intermediate and/or a final configuration of the computerized system as expected to be obtained once part or all submodules of the module have been executed, by traversing the DAG.

According to another aspect, exemplary embodiments are embodied as a computerized system including at least one hardware module or software module, and a run-time environment equipped with computerized methods designed for implementing all the steps of any one of the methods according to the methods disclosed herein. Said at least one hardware module or software module includes several submodules that are, each, a hardware module and/or software submodule, capable of producing and/or consuming data that can, in turn, be consumed and/or produced, respectively, by one or more other submodules of said module, consistently with edges of the DAG.

The exemplary embodiments can be embodied as a computer-program product, comprising computer program code means to implement all the steps of any one of the methods disclosed herein.

Systems, computer program products and methods embodying the present invention will now be described, by way of non-limiting examples, and in reference to the accompanying drawings.

DETAILED DESCRIPTION OF THE INVENTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

While working on a solution to the problems discussed in the background section, present inventors arrived at solutions that will find applications in many fields related to high-assurance environments, notably where compact, unambiguous identification of potentially large system states is needed, in the presence of slight runtime variation. As a result, the present methods and systems can generally be applied to computerized system modules' startup.

According to a first aspect, the present invention is embodied as a computer-implemented method for starting a module of a computerized system, comprising:

receiving graph data of a direct acyclic graph, or DAG, describing said module by way of nodes connected by edges, wherein:

at least part of the nodes are submodule nodes that correspond to submodules of said module, respectively;

submodule nodes are connected via one or more edges that reflect a data dependency between the corresponding submodules; and each of said submodules is a hardware module or a software submodule, capable of producing and/or consuming data that can, in turn, be consumed and/or produced, respectively, by one or more other submodules of said module, consistently with edges of the DAG, starting asynchronous execution of two of said submodules, respectively corresponding to two submodule nodes located in independent branches of the DAG; and determining at least a third submodule node that is a descendant of each of said two submodule nodes, according to an outcome of the execution of one or each of the corresponding two submodules, and starting execution of a third submodule that corresponds to the third submodule node determined, in view of completing the starting of said module.

Typically, the execution of the third submodule shall be started asynchronously with the execution of a fourth one of said submodules, wherein the latter is selected to be executed as a choice among a set of submodules at runtime, and the third submodule and the fourth submodule respectively correspond to two submodule nodes located in independent branches of the DAG, the method further comprising: determining at least one fifth submodule node that is a descendant of the two submodule nodes that correspond to said third and fourth submodules, according to an outcome of the execution of one or each of said third and fourth submodules; and starting execution of the fifth submodule, in view of completing the starting of said module.

In other embodiments, the DAG further comprises one or more control nodes, which correspond to control structures and connect, each, directly or not, one or more first submodule nodes to one or more second submodule nodes that are descendant of said first submodule nodes, and wherein the step of determining at least a third submodule comprises: checking an outcome of the execution of at least one of said two submodules by executing a control structure corresponding to a control node connecting one or each node corresponding to one or each of said two submodules, respectively, to said third submodule node.

In another exemplary embodiment, determining at least a third submodule node is performed according to both: an outcome of the execution of one or each of said two submodules; and an outcome of the step of checking the outcome of the execution of at least one of said two submodules.

For instance, one or more of the control nodes may comprise, or aggregate, each of multiple values, for checking multiple potential outcomes of execution of one or more of ancestor submodule nodes of said each of the control nodes.

In embodiments, said one or more of the control nodes aggregate each of said multiple values into a single value, which value is high-assurance configuration identifier such as a single hash value.

In another exemplary embodiment, the control nodes comprises at least one choice control node, having two or more ancestor submodule nodes, wherein only one of the corresponding submodules is selected to be executed at runtime, said choice control node comprising or aggregating multiple values for checking multiple potential outcomes of execution of any of said two or more ancestor submodule nodes of said one choice control node.

In other embodiments, the control nodes comprises at least one asynchronous completion control node, having two or more ancestor submodule nodes, wherein a corresponding control structure requires, upon execution, asynchronous completion of said two or more ancestor submodule nodes.

In other embodiments, the method(s) above further comprises: using the DAG to collect information as to the starting of the computerized system as it progresses, whereby values are computed that correspond to an intermediate or a final configuration, as obtained once part or all submodules of the module have been executed; and logging the computed values, e.g., in a form suitable for high-assurance system auditing.

In embodiments, the computed values may be compared to expected values as computed at build-time.

In additional embodiments, the above method(s) further comprises: at build-time, using a known description of said module of computerized system to create said graph data of the DAG and, eg, computing expected values corresponding to an intermediate and/or a final configuration of the computerized system as expected to be obtained once part or all submodules of the module have been executed, by traversing the DAG.

According to another aspect, exemplary embodiments are embodied as a computer-implemented method for creating graph data of a direct acyclic graph, or DAG, describing a module of a computerized system, by way of nodes connected by edges, the method comprising: using a known description of the computerized system to create said graph data of the DAG, wherein:

at least part of the nodes are submodule nodes that correspond to submodules of said module, respectively, the DAG further comprising one or more control nodes, which correspond to control structures and connect, each, one or more ancestor submodule nodes to one or more descendant submodule nodes;

submodule nodes are connected via one or more edges that reflect a data dependency between the corresponding submodules; and each of said submodules is a hardware module and/or software submodule, capable of producing and/or consuming data that can, in turn, be consumed and/or produced, respectively, by one or more other submodules of said module, consistently with edges of the DAG, the method further comprising: computing expected values corresponding to an intermediate and/or a final configuration of the computerized system as expected to be obtained once part or all submodules of the module have been executed, by traversing the DAG.

According to another aspect, exemplary embodiments are embodied as a computerized system comprising:

at least one hardware module or software module; and a run-time environment equipped with computerized methods designed for implementing all the steps of any one of the methods according to the first aspect of the invention, wherein said at least one hardware module or software module comprises several submodules that are, each, a hardware module and/or software submodule, capable of producing and/or consuming data that can, in turn, be consumed and/or produced, respectively, by one or more other submodules of said module, consistently with edges of the DAG.

In embodiments, such a computerized system further comprises a reporting environment configured for using the DAG to collect information as to the starting of the computerized system as it progresses and logging the collected information, e.g., in a form suitable for high-assurance system auditing.

According to a final aspect, the invention can be embodied as a computer-program product, comprising computer program code means to implement all the steps of any one of the above methods.

The following description is structured as follows. First, general embodiments and high-level variants are described (sect. 1). The next section addresses more specific embodiments and technical implementation details (sect. 2).

1. General Embodiments and High-Level Variants

Figure 2:
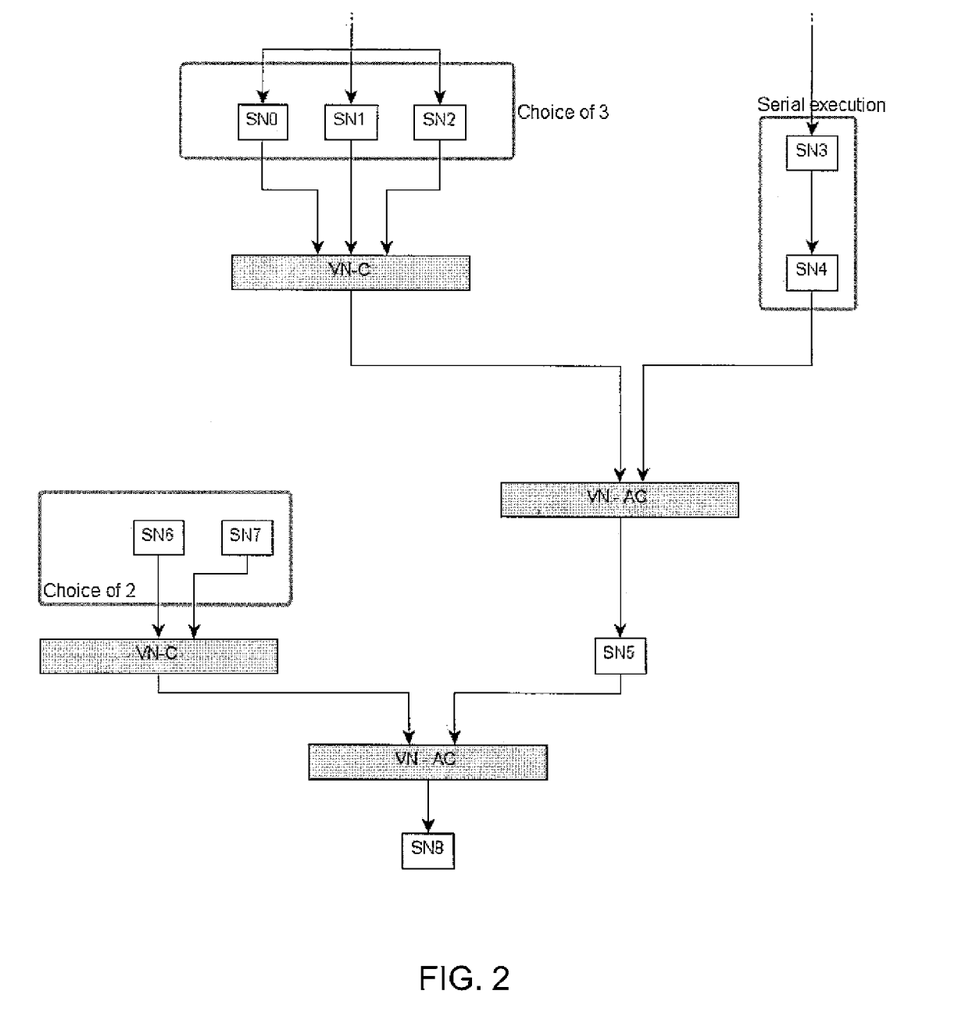
FIG. 2 is a diagram schematically illustrating selected components involved in present methods, including submodule nodes and control nodes of a direct acyclic graph (or DAG) used to start modules of a computerized system, according to embodiments.
Figure 3:
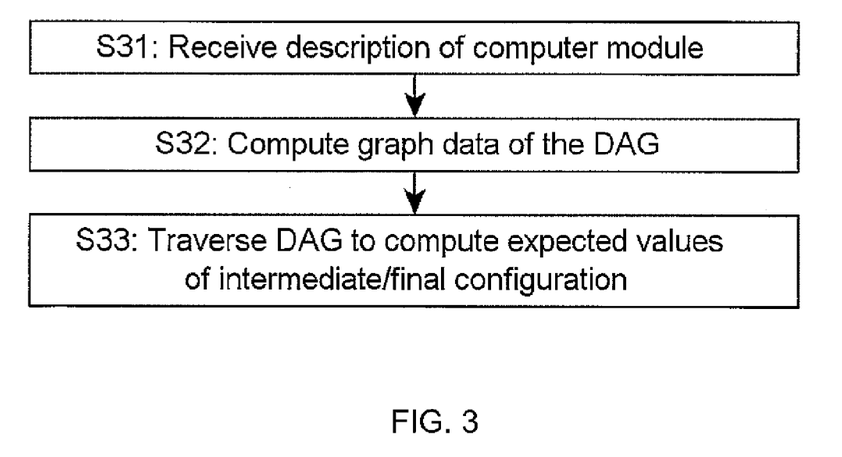
FIG. 3 is a flowchart illustrating high-level steps of a method for computing a DAG, at build-time, according to embodiments.
Figure 4:
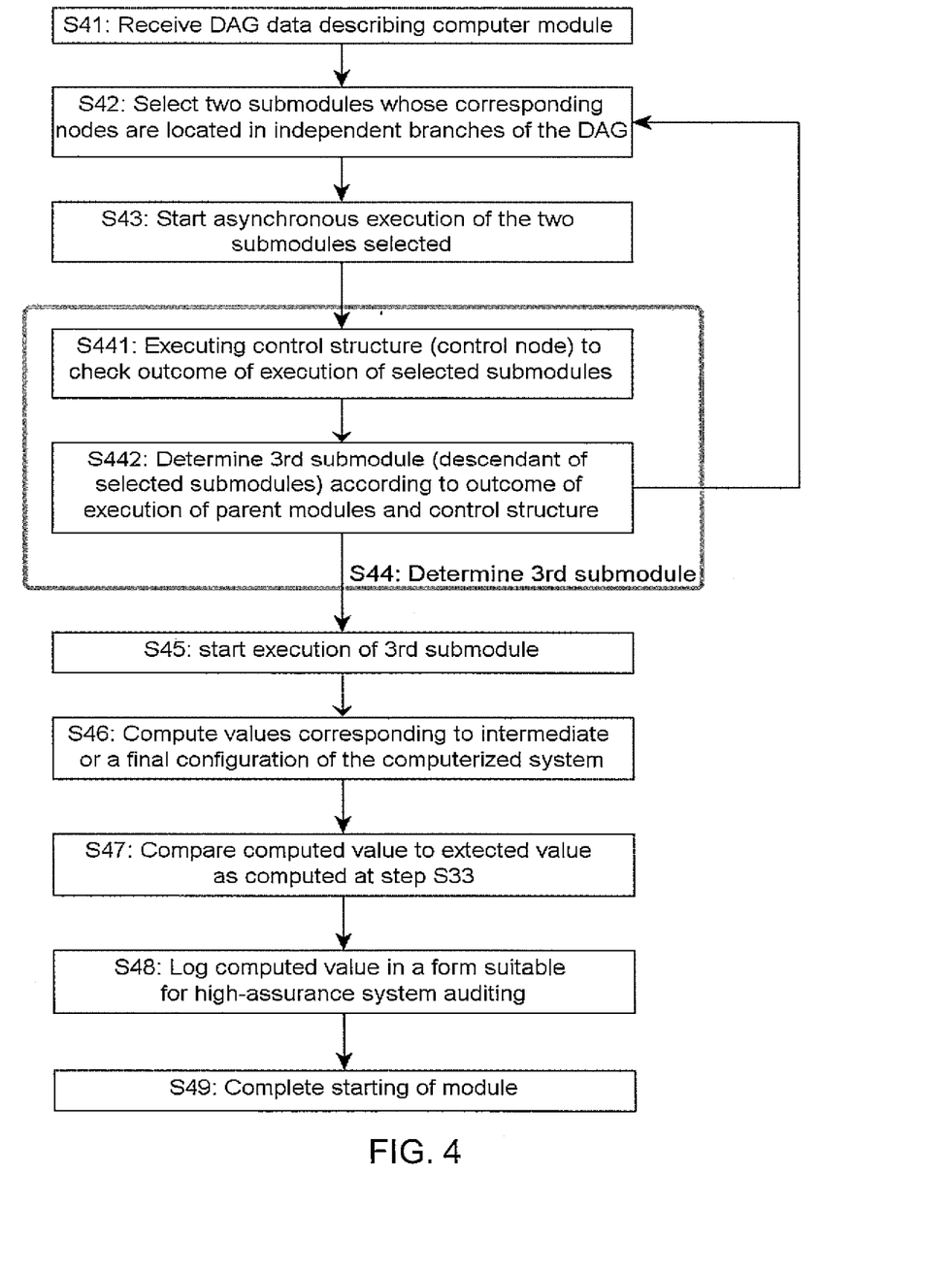
FIG. 4 is a flowchart illustrating high-level steps of a method for starting a module of a computerized system, according to embodiments.

Referring generally to FIGS. 1-4, with emphasis put on FIG. 4, a general aspect of the invention is first described, which concerns computer-implemented methods for starting a module of a computerized system 100.

Such methods rely on a direct acyclic graph, or DAG 10, describing said module by way of nodes connected by edges. In detail, at least part of the nodes of the graph are "submodule" nodes, referred to by "SN" in the appended drawings, i.e., nodes that respectively correspond to submodules of the module to be started. Submodule nodes SN are connected via one or more edges E, which reflect a data dependency between the submodules they connect. Each of said submodules can be a hardware module or a software submodule, capable of producing and/or consuming data that can, in tuna, be consumed and/or produced, respectively, by one or more other submodules of said module, that is, consistently with the edges of the DAG. An example of a local region of such a DAG is shown in FIG. 2. A DAG is otherwise known per se. As the skilled person understands in the present context, a full DAG would likely comprises many more nodes. Typically hundreds of nodes can be expected, even in state-of-the-art client systems. In enterprise systems, tens of thousands of nodes can typically be expected (e.g., using a Linux system), it being noted that the actual number would still be impacted by the many possible drivers and other OS/infrastructure variations.

Basically, exemplary methods first comprise receiving S41 graph data that capture the DAG 10.

Figure 1:
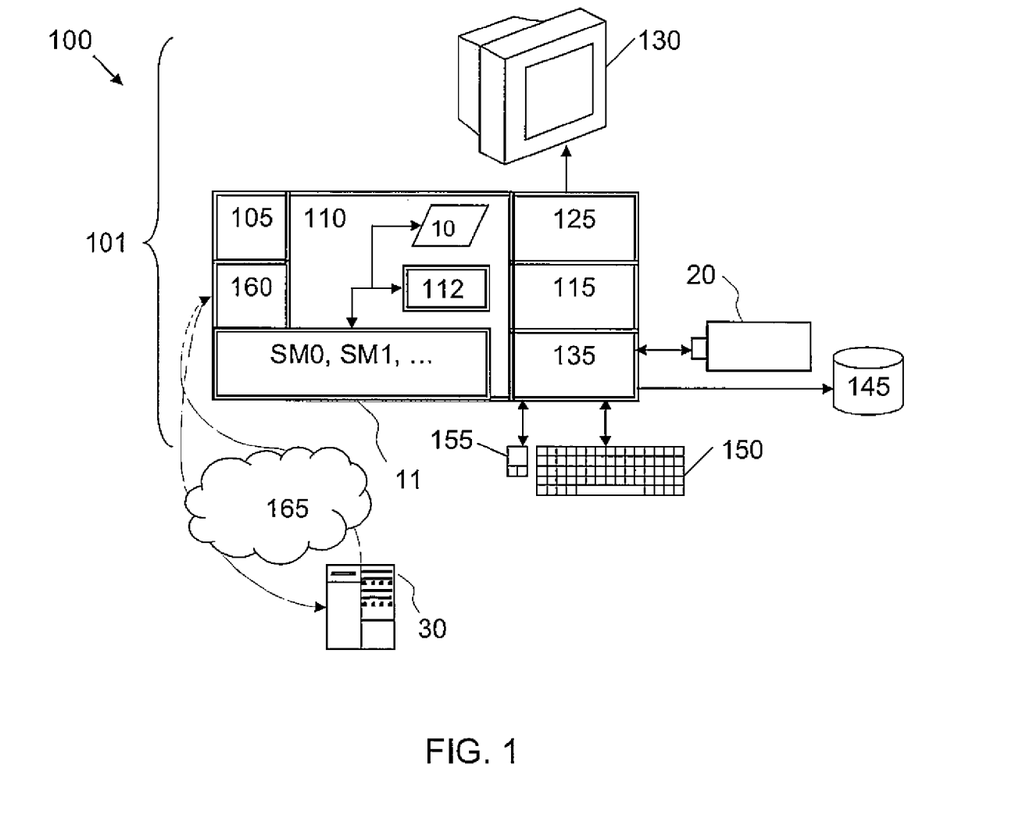
FIG. 1 schematically represents a general purpose computerized system, suited for implementing one or more method steps as involved in embodiments of the invention.

Then, asynchronous execution of two of said submodules is started, steps S42, S43, which submodules respectively correspond to two submodule nodes (for instance nodes SN0 and SN3) that are located in independent branches of the DAG. How to locate such nodes can easily be achieved thanks to known graph traversal methods, based on the graph data, as the one skilled in the art knows. In the following description of the present methods, a given submodule may be referred to by its corresponding node in the DAG or the corresponding node reference "SN", for simplicity. In FIG. 1, though, submodules are denoted by reference "SM".

In the example of FIG. 2, and as to be explained in more details later, execution of the submodule SN3, shall then lead to execution of the submodule SN4, as the submodules SN3 and SN4 are subject to serial execution. As further seen in FIG. 2, one of said nodes (node SN0 here) can for instance be selected as a choice among other submodules SN1, S2, at runtime. More generally, each of the nodes SN0 and SN3 could be selected to be executed as a choice among respective sets of candidate submodules at runtime. This is explained later in detail.

Next, it is determined S44 at least a third submodule node, for example SN5 in FIG. 2, that is a descendant of each of said two submodule nodes previously selected, i.e., SN0 and SN3 in our example. The determination step S44 makes use of an outcome of the execution of one or each of the two submodules corresponding to SN0 and SN3, and possibly SN4, as execution of the latter follows that of SN3.

Finally, once the descendant node SN5, i.e., the third submodule node, is determined, execution of the corresponding submodule can be started, see steps S43, S45 in FIG. 4, in view of completing S49 the startup of the module.

The above steps typically repeat, in practice, as illustrated in FIG. 4. Namely, the execution of said third submodule SN5 may next be started S42, S43 asynchronously with the execution of a fourth submodule of interest, e.g., SN6 in FIG. 2. Again, the latter can be selected to be executed as a choice among a set of submodules at runtime. The third SN5 and fourth submodules SN6 respectively correspond to two submodule nodes that are, again, located in independent branches of the DAG. Then, following the flowchart of FIG. 4, at least one fifth submodule node SN8 can be determined, step S44, which node is a descendant of the two submodule nodes SN5 and SN6, and this, according to an outcome of the execution of one or each of the submodule SN5 and SN6. Finally, execution of the fifth submodule SN8 can be started, step S45, and so on, in view of completing the startup.

Thus, exemplary embodiments exploit parallelism by asynchronously executing submodules corresponding to nodes in independent branches of the DAG, which will save time at startup. The DAG describes the entire module, including its hierarchy, i.e., a DAG can be regarded as a hierarchical decomposition of the full module.

It is a prerequisite of asynchronous/independent submodule nodes selected for execution to be located in independent branches of the DAG. Note, however, that these independent nodes may have common successors/predecessors. Now, there are no specific constraints between the actual nodes themselves, or at least none that would be known beforehand and captured in the DAG, by way of a single edge i.e., there is no direct dependency between such nodes.

The composition of the entire module may be reflected in the DAG, which can be, if necessary, tagged with metadata, to ease the reconstruction of the original module structure from the DAG.

However, this is not requested in the present approach, as only the relevant, local pieces/groups of nodes need be interpreted, while the whole structure need not be known at each instant.

As said, the determination step S44 makes use of an outcome of the execution of one or each of the two submodules previously selected. Remarkably, this outcome was typically not available before said execution, i.e., the present approach allows for some non-determinism, at variance with known methods. Note that the determination step S44 may nevertheless be carried out according to metadata received in addition to the DAG, which metadata could, e.g., be used to restrict to a set of potential candidate submodules, known or determined prior to the execution of the above steps, i.e., prior to run time execution.

In practice, one may be more interested in the startup of specific submodules, e.g., a console for local login, and ignore all non-dependencies thereof. This way, at runtime, it can be dynamically selected which submodule is targeted as the final startup target. Still, in variants, the DAG could describe the entire system of interest, i.e., module or even the whole computer system, and the present approach could be used to start the whole system.

Referring now more specifically to FIG. 2: in embodiments, the DAG further comprises one or more control nodes ("VN"), which respectively correspond to one or more control structures. Such control nodes connect submodules nodes to each other, directly or not. That is, one or more first submodule nodes may then be connected, via control nodes, to one or more second submodule nodes that are descendant of said first submodule nodes.

As illustrated in FIG. 2, this connection can be indirect, inasmuch as a control node (for instance VN-C) may connect to another control node VN-AC which in turn connect to the "third" submodule node. Usually, one will have one output/descendant of a control node. If there are multiple descendants, they should be processed in parallel. In other words, a node with two immediately following nodes underneath launches execution of the two of them.

Thanks to control nodes, the determination step S44 (to determine a third, descendant submodule) may involve a step of checking S441 (see FIG. 4) an outcome of the execution of one or each of the two submodules previously selected for execution, by executing the control structure corresponding to a control node VN that connects one or more of the previously selected submodules to a third, descendant submodule.

Interestingly, one or more of such control nodes VN may comprise, e.g., and aggregate, each of the multiple values. This way, it is possible to check multiple potential outcomes of execution of one or more of the ancestor submodule nodes of a control node, even when the actual outcome of the execution is not known in advance. In a simple implementation, these multiple values correspond to multiple potential outcomes of the execution of one or more, or each of the ancestors (submodule nodes) of the control nodes. The actual outcome is checked against one of said multiple values. Yet, such control nodes may aggregate, each of said multiple values into a single value, which value may be a high-assurance configuration identifier such as a single hash value. In the latter case, it is possible to check the actual outcome of the execution of the previously selected submodules, thanks to methods discussed below in detail. In either variant, non-deterministic situations can be handled thanks to the control nodes, which may also prevent combinatorial explosion of the system, for reasons explained in the next section.

The determination step S44 may decompose into two sub-steps. In a first sub-step, S441, a control structure is executed, thereby allowing an outcome of the execution of at least one of the two submodules previously selected submodules to be checked. The determination of a further submodule is then carried out at sub-step S442, whereby a third submodule node can be determined according to both: an outcome of the execution of one or each of the two submodules previously selected for execution; and an outcome of the step of checking S441. This shall be exemplified later.

As illustrated in FIG. 2, several control structures, possibly of different types, can be involved. The control nodes can also be referred to as virtual nodes, inasmuch as they do not directly correspond to submodule. Two types of control nodes are depicted in FIG. 2. Some of these (VN-AC) are used to check for asynchronous completion of the parent nodes, while others (VN-C) are used to check the consistency of a choice carried out at an upper level in the DAG. As seen in this example, a control node VN may connect (not necessarily directly), one or each node corresponding to one or each of the two submodules previously selected for asynchronous execution, to said third submodule node.

The control nodes of the first type can be referred to as asynchronous completion control nodes VN-AC. Such nodes shall typically have two or more ancestor submodule nodes. Their corresponding control structure requires, upon execution, asynchronous completion of these two or more ancestors. Asynchronous completion nodes include alternatives control nodes, i.e., control nodes located in the DAG such that one of their predecessors includes a choice. For instance, in the example of FIG. 2, exactly two predecessors (the choice of SN0/1/2 and SN4) must, each, terminate, before an asynchronous completion control nodes VN-AC allows execution to be continued at node SN5.

For example, alternatives can be processed by collecting all prerequisites, and then by calculating, e.g., a compound hash (after normalization). The resulting hash shall match its counterpart as calculated offline only if the alternatives' configurations (regardless of the actual completion order) are identical to the expected one.

Other control nodes can be referred to as "choice" control nodes. Again, such nodes may have two or more ancestors (submodule nodes). As per embodiments of the present methods, only one or more of the ancestors (nodes above the choice control node) might be selected for execution, and this, as a choice made at runtime. In such a case, the choice control nodes may, again, comprise or aggregate multiple values for checking the execution of one (or more) of the selected ancestor submodule nodes. Said multiple values should anticipate the potential outcome. of any of the potential candidate ancestors that may be selected at runtime.

Other types of control nodes and structures are described in the next section.

Next, interestingly, and as illustrated in FIG. 4, embodiments of the present methods may further use the DAG to collect information as to the starting of the computerized system, as it progresses. To that aim, values are computed, step S46, which correspond to an intermediate (or final) configuration, as obtained once part (or all) submodules of the module have been executed. Then, the computed values can be logged, step S48, e.g., in a form suitable for high-assurance system auditing.

In an exemplary embodiment, the values computed at step S47 are compared to expected values as computed off-line, i.e., at build-time, see step S33 of FIG. 3, as to be discussed now. At build-time, a known description of the module of interest can be used, step S31, to create S32 the needed graph data of the DAG. Then, the expected values (corresponding to intermediate or final configurations of the module) can be computed S33, to obtain, in advance, the values as expected to be obtained once part or all submodules of the module have executed. This can be achieved thanks to know methods, by traversing the DAG.

Still referring to FIG. 3, and according to another aspect, the present invention can further be embodied as methods for creating the graph data of the DAG 10, independently from the runtime steps described above. Basically, such methods use a known S31 description of the computerized system to create S32 the DAG data. Such methods may further comprise computing S33 said expected values by traversing the DAG, as said above.

Referring now to FIG. 1, and according to another aspect, the invention can be embodied as a computerized system 100 comprising hardware and/or software modules and a run-time environment 112 (e.g., loaded in memory 110), for implementing computerized methods as discussed herein, that is, for implementing part or all of the run-time steps described above. As explained earlier, a hardware/software module comprises several submodules SM0, SM1, etc., that can, each, be a hardware or software module (notwithstanding the fact that hardware submodule can be complemented by software, as known per se), producing and/or consuming data, consistently with edges of the DAG 10. The latter can, e.g., be loaded in the main memory 110 for subsequent use.

Advantageously, this computerized system may further comprise a reporting environment (typically loaded in the main memory for execution by the processor 105), i.e., an environment configured for: (i) using the DAG to collect information as to the starting of the system as it progresses and (ii) logging the collected information, e.g., in a form suitable for high-assurance system auditing. Such a computerized system is described in more details in the next section.

Note that a similar computerized system may be used to build the DAG, at build-time, except that no run-time environment (as defined above) is needed for building the DAG. Rather, the system used to build the graph data shall be equipped with ad-hoc computerized methods as described in the next section.

The present invention can also be embodied as a computer-program product, comprising computer program code means to implement computerized methods as described above, namely the run-time steps or build-time steps described above.

The above embodiments have been succinctly described in reference to the accompanying drawings and may accommodate a number of variants. Several combinations of the above features may be contemplated. Examples are given in the next section.

2. Specific Embodiments and Technical Implementation Details 2.1 Specific Embodiments The specific embodiment described here merely concern high-assurance attestation of system state with dynamic composition of non-deterministic, asynchronously terminating submodules, as examples of applications of the more general concepts described in the previous section.

As noted in introduction, the known methods may not describe any non-determinism, such as uncoordinated completion of unrelated submodules, even if all the final states of the latter would be individually accepted by the system. This problem is particularly prevalent in high-assurance security systems, environments requiring reliable auditing, compliance-tracking, or configuration management.

Current computing systems may significantly reduce startup latency by exploiting parallelism when starting unrelated hardware and software submodules. Even commodity personal devices nowadays contain enough components to considerably benefit from parallelization at startup. Still, the benefits are expected to be more pronounced in larger enterprise/server environments. However, hash-based aggregation of multiple submodule states is possible only when forcing a specific evaluation order. This in turn prevents use of most startup-latency reduction techniques in integrity-attested systems.

Here, examples of systems are described, which may coexist with startup-parallelization tools and can accommodate hash-based configuration identification in the presence of parallelism, alternatives selected during runtime, or optional completion. In the following, it is notably shown how to accurately and efficiently describe the configuration of loosely coordinated submodules in the presence of non-determinism as described above.

The specific methods and systems described in this section assume the use of some dedicated hardware during runtime, with fixed bounds on resource usage. In addition, it is notably shown how, at the cost of modest runtime-complexity increase and decreased performance, present systems may be implemented purely in software.

2.1.1 Summary

First, some general aspects of the specific methods and systems are discussed. Such methods derive a single, unambiguous configuration identifier for a runtime environment containing multiple, loosely coordinated submodules, each capable of reporting its configuration. The present approaches description may accommodate asynchronous completion, alternatives, optional submodules, or arbitrary combinations of these sources of nondeterminism. Since such structures are only evaluated at runtime, present systems need not serialize their entire execution to resolve ambiguity. The lack of synchronization differs from typical hash-based attestation schemes, which intentionally serialize almost all execution. Even more so, tightly synchronized execution in the presence of parallelism imposes unnecessary latencies in practical systems of even modest parallelism [Don13, slide 21].

Here, a dependency graph is built, which connects submodules and propagate direct submodule-based dependencies to discover a full, system-wide data-flow graph, i.e., a DAG connecting initial system state to the desired operational state [BBD+12, III.A]. To build such a graph, one may utilize system-provided submodule dependency information, particularly if the latter is exposed by the system infrastructure itself, as is the case in many state-of-the-art environments [PSL12] [Mah05]. In a typical instance, the target operation state would mean successful application startup upon comparing a target state with the expected one. From the DAG, on can extract information where non-determinism is possible, such as with non-serialized parallel completion or where a submodule is selected from a fixed set at runtime, as illustrated in FIG. 2.

As discussed earlier, it is advantageous to insert control nodes, and notably aggregator "operations" nodes into the DAG, which may notably be designed such as to normalize the supported nondeterministic flows to single hashes. Since these control nodes generate deterministic results if and only if they match (one of their) off line expected configurations, they prevent combinatorial explosion of the entire system, even if many combinations could be encountered at runtime. As a result of this normalization, the present system may generate an expected configuration for all nodes of the DAG, regardless of the number of variations foreseen within the graph. In that respect, it can be noted that runtime resource consumption scales with some of the number of variations, but this scaling will a priori have known bounds.

Once the DAG (augmented with control nodes) is available, one may for instance enumerate the additional nodes required and their interconnections. We may then present an execution plan as an annotation to the DAG, documenting how and where these additional nodes reside within the system. The augmented DAG is deposited in runtime-accessible memory, so the much simpler runtime component may parse it and track execution along the DAG as submodules are started, and furthermore report completion. When the intended final application state is reached, we may report it. without ambiguity. If the system is deployed in environments which already support asynchronous startup (e.g., systemd on current Linux systems [PSL12]), one may furthermore easily integrate the present configuration-checking with the asynchronous events of the startup-manager itself.

Note that the present definition of nondeterminism only includes non-deterministic execution of known submodules, but specifically excludes execution of unknown submodules. Our model assumes that all eligible submodules would be known at runtime. This model provides an unambiguous representation of execution of specific combinations of these submodules, even if their runtime behavior is not fully known during the build-time pre-computation. Launching only fixed, known submodules is typical in high-security environments, therefore the present assumption is already met by most deployed systems.

Next, we may assume the following system-provided prerequisites:

1. Submodules shall supply unambiguous information about their configuration, with a value considered to be representative, with high assurance, such as a cryptographic hash computed over configuration metadata. Similar values must be available if the present methods are used to launch only approved submodules. In such cases, the representation could be of executable code—such as digital signature of a library—and not post-execution state.

2. An online verification system, which can parse pre-computed information during startup. This verification is expected to run in a trust worthy environment, potentially with limited resources, and may only partially trust the pre-computation.

3. A runtime environment parsing dependencies, launching submodules when they become eligible (i.e., all their prerequisites become available) and storing configurations reported by them. This runtime component shall be able to observe and control all visible submodule interactions, essentially implementing or using known startup-controlling infrastructures [PSL12].

If the target environment already includes infrastructure to manage asynchronous startup, then the present method(s) could be implemented as an additional, lightweight component of that infrastructure.

4. A reporting environment capable of logging the final configuration, and possibly intermediate ones, in a form suitable for high-assurance system auditing.

5. Optional use of hardware or software "configuration aggregators" (control nodes) which can be fed with multiple hashes asynchronously and can report aggregate results as a separate configuration.

6. List of drivers, available hardware, and their expected configurations, stored in a host-visible database, to be able to launch the submodules. A transformed version of the same information may be used during system startup, therefore this information shall typically reside in startup accessible storage. A very detailed configuration list may be exposed by the system. The pre-computation process may trim down a complex model into a simpler model, more suitable for resource-constrained use.

Use is made of logical dependencies between the subsystems, e.g., either based on offline annotations, or dynamically derived from subsystem metadata. As an example, use of networked filesystems depends on networking, which in turn depends on drivers for the different kinds of supported hardware. Extending this example, disk subsystems may feature similar dependency chains, which are however generally independent of those of network devices.

7. An offline pre-computation system, which can compile the graph of possible dependency chains between hardware or software submodules. This system is expected to run in a resource-rich environment, infrequently, and its execution is most likely not seriously time-constrained.

With these components, we may reliably report configurations under the conditions assumed above. Most of the present methods apply directly to hierarchical systems if they may describe the connections between submodules with similar dependency graphs such as configuration-management systems.

In addition to the final configurations, the present systems may also log specific sub- or intermediate configurations, if required for audit purposes, but this is not necessary to verify the overall integrity of the system.

2.1.2 Description of Exemplary Systems

Present methods may describe all of the following control structures, which are practically sufficient to represent all relevant device/driver/subsystem interactions [RCK+09, 3.1]:

1. Serial composition: subsystem/s awaiting one or more prerequisites, starting execution when all are available 2. Uncoordinated, parallel execution of multiple subsystems 3. Choice: launching some multiple eligible subsystems, depending on fixed or runtime-conditional conditions 4. Optional completion: explicit indication of a submodule not terminating—or simply inactive, not generating system-observable output—represented as a specific event 5. Interruption, or other early termination Note that all of the above control structures, except serial composition, include runtime nondeterminism which may not be fully anticipated during offline computation.

Exemplary systems may hierarchically combine the above control structures. As an example, a subsystem depending on one of several network drivers, and one of several filesystems, would depend on the serial composition of two choices.

Serial composition is already described, per se, in known, prior art schemes [Tru11, 4.4]; they are nonetheless mentioned for completeness. All other listed interactions conflict with currently used hash-based attestation methods.

Tools can be devised to discover dependencies between installed hardware components, and drivers utilizing them. Based on such dependency information, we construct a directed, acyclic graph, i.e., the DAG, connecting subsystems producing and/or consuming data as described earlier, i.e., where graph nodes represent individual subsystem, and edges denote direct data dependencies, see [BBD+12, 3], for a similar implementation (although the latter does not disclose a system that can be extended to incorporate runtime nondeterminism). This graph terminates at the final intended system state, when all dependencies have completed, i.e., the system or part thereof is operational. The graph describes how submodules form prerequisite sub-graphs, and, implicitly, which of them may be asynchronously started. We can then map interactions within the graph into combinations of the supported primitives (alternation, serial composition, choice of N known primitives) as described above, inserting control nodes for some of the configurations.

As an example, the upper, right-hand subgraph of FIG. 2 shows two unrelated dependencies, and a serial composition. The upper, left-hand subgraph also shows two unrelated dependencies and a serial composition. Let us consider the upper, right-hand subgraph:

1. Submodules corresponding to nodes SN0, SN1 and SN2 are executed as a choice: exactly one would be selected at runtime, according to embodiments discussed earlier;

2. Submodules SN3 and SN4 have a direct dependency: the output of SN3 is used by SN4; and 3. Submodule SN5 may be started only when SN4 and the choice of SN0/1/2 have both completed execution.

In this example, the choice of SN0/1/2 and the asynchronous step combining choice (of SN0/1/2) with the output of SN4 would need specialized representation. As shown in FIG. 2, the GAD is augmented with control nodes VN, as shown as grey rectangles, which aggregate multiple results to single hashes.

Serial execution extends a hash chain, or otherwise combines hashes, such as reporting hash(hash(SN3)||hash(SN4)) as a compound configuration of SN3 followed by SN4, see e.g., [Tru11, 4.4].

Serial execution, involving only deterministic logical concatenation, requires no graph modification.

The "choice" control node will check and therefore accept exactly one of the SN0/1/2 configurations, and return a result if and only if the selected node returns a value matching of the expected values. Therefore, the output of this node is a single hash, and the known-good choices would be known during the graph construction.

The "alternatives" control node depends on all submodules providing input to it, and terminates when the required number of results have appeared. In the present case, exactly two predecessors (SN0/1/2 choice and SN4) must terminate, then execution may follow to SN5.

Alternatives are processed by collecting all prerequisites, then calculating a compound hash after normalization. The resulting hash matches the offline calculated one Only if the alternatives' configurations—regardless of actual completion order—are identical to the expected one.

Optional completion maps to a choice combining the expected value/s with a special value, the latter designating non-completion, i.e., an "unused" (that is, valid but not occurring in the DAG) hash to indicate that a given component did not complete its startup, or failed to report completion. The point here is to be able to unambiguously say that a component did not start. Such a situation can be accommodated, for example a component failing startup could be tolerated but would need to be logged. If the submodule fails to terminate—such as when timing out—we replace the status hash with the predefined value. In that case, the choice will simply reflect the lack of submodule response.

The runtime environment is made aware of the control nodes when accessing the DAG, even if it may not be aware of the original graph construction. As noted earlier, precomputation may involve sufficient context to track back configuration to the original dependency graph, if necessary, e.g., as a maintenance aid, but this is not needed by the runtime environment.

Note that, while the original reason for nondeterminism differs, aggregator structures are substantially similar for choices and asynchronous completion. For instance, both types of control nodes may, each, aggregate multiple values for checking multiple potential outcomes of execution of one or more of their ancestor submodule nodes. In practice, and as described below in the section "Hardware implementation," a single primitive may efficiently instantiate both basic non-deterministic primitives.

2.1.3 Offline Pre-Computation

Dependency graph construction is expected to be available, e.g., either through offline annotations of installed packages, or dynamically derived from subsystem metadata, and reported by system tools managing such dependencies. Offline annotations documenting prerequisites and provided services are widely used, and standardized, see e.g., startup script fields in Linux [ISO06, 20.3], FIG. 6. In systems that support such standardized annotations, some already existing tools may likely be used to simplify graph construction. Typical systems currently feature loosely connected groups of essentially unrelated activity, and an important goal is to locate and utilize the inherent parallelism in such systems.

Dynamic dependency resolution is widely supported in practical systems [PSL12, "Units"] [Cor10], but it may lack explicit annotations. Here, the present offline pre-computation may rely on extracting the raw dependency graph from existing libraries, such as discovered by startup-managing system tools, both generated by standard system utilities.

The dependency graph must be scanned by the pre-computation system to identify the known source of non-determinism. Once found, control nodes can be inserted into the dependency graph as described above. Metadata accordingly added to the graph shall typically identify processing steps for later use by the runtime component, such as annotating the scenario by referencing the source of nondeterminism. When the graph has been augmented, we store it in a form suitable for runtime use, e.g., in a format simpler than that used during pre-computation.

The number and required capacity of configuration aggregators is a system-dependent constant, discovered during precomputation. If present methods are instantiated with access to reconfigurable hardware, offline graph construction may optimize the plan and exact resource constraints, allowing implementation with conservatively sized resource usage.

It is advantageous to implement present systems with intermediate formats suitable for single-pass processing, which then can be used by the runtime component directly. One particularly useful annotation is a prefix, specifying the number and nature of nondeterministic structures, especially the number of aggregator nodes. This allows even a resource-constrained runtime environment to utilize pre-computed data, since it may verify/limit resource usage, and verify that preprocessing operations have derived the correct upper bounds.

Since dependencies shall likely change only when drivers are installed or removed from the system, graph/dependency precomputation needs to be performed only infrequently.

2.1.4 Runtime Operation

As a result of the present approach, during startup, the runtime environment augments the functionality of a usual startup-manager tool [PSL12], using graph assisted additions to manage nondeterministic execution. For instance:

1. Scan the list of dependencies, and track submodules' execution state;

2. Instantiate control structures when nondeterminism must be mapped back to unambiguous identifiers;

3. Create the interconnect network tracking DAG configuration, such as logically connecting START and READY signals of instantiated components, as described by the DAG itself. When instantiated in software, interconnects reside within the software control flow, not explicitly instantiated;

4. Retrieve reported configurations from submodules. Store these values into system registers if the environment is assisted by configuration-reporting hardware, see, in that respect [Tru11, 4.4];

5. Log reported configurations to an audit system, if necessary;

6. Control flameouts to prevent system lockup. Report timeout events as the previously described "did not terminate" signals, when a component may be optional.

7. Indicate completion, final state, and the nature of the latter, i.e., did we terminate in an expected state? Once the final state is reported, present systems need not be involved with subsequent startup activities, unless submodules may be started later.

2.1.5 Hardware-Assisted Implementation

Our system may use hardware for two specific purposes, both to increase security, and to increase performance. The two capabilities are orthogonal, and may be added separately, without changing the overall nature of the system.

Intermediate configuration values may for instance be stored in hardware-back end registers, immune to software-based manipulation, if the runtime environment supports it. As an example, platform configuration registers (PCRs) available in trusted platform modules (TPMs) [Tru11, 4.4] are dedicated for use as such reliable storage. While the present intermediate configurations featuring multiple hash values do not fit PCRs, present systems may store any of the derived values to PCRs. Therefore, if the environment provides secure storage even for intermediate configurations, it can be more optimally utilized.

Nondeterministic structures tolerated by the present systems may be implemented by a single hardware primitive, owing to the similarity in processing and data structure for subsystems with asynchronous completion or choice. A minimal hardware unit, when available, greatly simplifies implementation:

Store a counter of expected asynchronous dependencies, or number of expected choices (N);

Provide registers for N configurations, e.g., hashes;

Provide a thread-safe "add new hash" interface, which allows new hashes to be added without explicit synchronization;

Provide predefined hashes for the N accepted configurations, if the unit is deployed as a choice of N predecessors;

Allow normalization of the N hashes (used only by asynchronous completion);

Output a single, combined hash as final configuration, when execution completes, i.e., all prerequisites terminate Any additional features, such as termination due to timeouts, may be managed by the runtime environment directly, and need not be represented in the present execution unit, i.e., the multi-hash compound which is responsible for generating one particular hash.

When hardware resources are not available during runtime, present systems may be instantiated fully in software, with the following additional requirements:

A software implementation must control concurrent access to aggregator components, especially those aggregating unrelated submodules' outputs.

Since aggregators require only local coordination, i.e., must react to their direct predecessor submodules, the necessary locks may be hosted within aggregators. This implies that we do not create a single, global lock as a scalability bottleneck, at the cost of additional memory consumed by distributed locking.

Aggregation in hardware is suitable for completely asynchronous operation, supplying START and READY signals in a globally uncoordinated fashion. Software counterparts of the same functionality would depend on additional libraries to achieve similar performance.

Generally, a software instantiation could approach the performance of a hardware environment, but would be more complex than graph-specific synthesized hardware.

2.1.6 Extensions

Present system descriptions assume that the submodule dependency resolution is offline, and that configuration reporting is based on a posteriori analysis of submodule states. This is the typical setup in high-assurance computing devices, such as hardware security modules (HSMs), where all available submodules must have been previously verified, such as during the firmware update that caused to install them. In systems with such physical protection, all available submodules are implicitly trusted, and attestation needs to report only the final state reached by the system. Under these constraints, present methods may be used as described earlier, adding no security vulnerabilities by not verifying launched submodules' integrity individually.

Similar local protection may be available on some embedded platforms, alleviating the need for initial checking before each use of submodules, see e.g., [Saf13, "Run-time firmware protection . . . "].

Systems with partially trusted firmware storage (most commodity operational environments belong to this category) need to verify the integrity of submodules before they are launched. In such systems, an additional step would verify signatures on an object, the presence of their configuration on a whitelist, or otherwise approve a submodule before it is launched [Tru11, 13.2.2] [FIP01, 4.6.1]. Other than this additional verification, present methods are applicable without modification.

The present systems may easily be extended to increase the work effort of generating hash collisions, if deployed in a high assurance environment, which partially mistrusts the submodules it integrates. Specifically, we may prevent an untrusted submodule from manipulating the hash calculation aggregating its output, such as when integrating submodule-originated hashes into a compound hash. Present systems system could be extended to include a system-defined, randomly generated "salt" to compound-hash calculations to randomize Such addition would be easy, as an example, by inserting an initial starting block—which is salted—to the hash calculation, effectively perturbing the hash state in a reproducible fashion.

By generating a fresh salt with each recalculated configuration, and inserting it into the graph-describing metadata, the importing system could repeat all calculations essentially unchanged, and no algorithmic changes are needed. While salting does not change the hash algorithm, it perturbs the hash calculation sufficiently to hinder submodules in the—theoretical—case where they may attempt to influence the hash calculations of compound hashes involving their output.

Consistency checks on submodules with very large domains—such as filesystems—can be represented in present systems indirectly, if they need to be included in the system configuration. In systems where some choice spaces are inconveniently large, one may add a "checker" submodule to verify consistency and to approve or reject a specific, runtime-determined state, and propagate the result of this checker submodule to the rest of the system. Such checking would compress the state of the hierarchically-decomposed subsystem to a small set of possibilities—which could then be managed as a choice—and optionally logging the original lower-level detail.

In practice, one would introduce a filesystem checker as a service (i.e., fsck return value), some evaluator service which approves or rejects the runtime-encountered choice, or similar indirection. Such hierarchical treatment does not change the functionality of the present systems—the same configuration check would simply be passed through a layer of indirection—but it simplifies DAG representation at the cost of an additional service. For systems where all components' state would need to be represented, such compression is highly recommended.

Generalizing the functionality of checking services, the same abstraction could be represent consistency checks of multiple submodule results, if required. As an example, with a subsystem describing multiple hardware alternatives, and a separate service representing the loaded driver/software, a checker service could simply approve known-good combinations, and indicate a configuration mismatch otherwise.

2.1.7 Limitations

The systems specifically discussed in section 2.1 shall efficiently describe choices only from a reasonably small, fixed set. The present approach does not easily scale to submodules with large internal state, such as filesystems or other submodules having too many possible configurations. The actual tolerable limit is, however, strongly system-dependent. This restriction would apply even if choices would be fixed, and possible to fully enumerate offline. As a workaround representing large choice domains, see the section "Extensions" below.

Considerations for hash collisions are as follows. While our system is based fundamentally on comparison of hashes as representative identifier of a large number of images, we assume use of a cryptographic hash function of sufficient strength to make (accidental or constructed) hash collisions infeasible. Under these assumptions, we assume hash collisions to be negligible problems [Bla06], an assumption shared by state-of-the-art attestation systems based on hash functions [Tru11, 4.2.6]. The present methods may be implemented based on a "sufficiently strong" hash function.

Note that certain precautions may be taken by the system against random hash collisions, at almost no extra cost. Our graph computation may be "salted" by system-generated random data—see §. Extensions—that similarly hinders active attacks on the underlying hash function. As an example, the hashes used to represent "missing"—see "Optional components"—may be checked at build time, selecting a different one until it collides with none of the hashes appearing in the system hash graph.

Large systems, especially enterprise server environments with many device/software submodules, may generate prohibitively large dependency graphs when enumerating all their installed drivers and hardware. However, practical systems may manage DAGs of considerable complexity at runtime, if intermediate representations are selected to simplify graph traversal—such as high-performance computing applications which dynamically assign blocks of computation across multiple computational nodes [BBD+12, 3.1]. In practice, comparable graphs describing tens of millions of transactions as hash chains—analogous with inter-submodule dependencies in the present system system—between millions of nodes have been parsed with reasonable resource usage; present implementations may use similar techniques.

In practice, implementations selecting graph encodings which can efficiently enumerate graph edges will be able to scale even to large graphs, if cuts are tracked as opposed to working on the entire graph. Known graph-transformation techniques may be used to transform DAGs to bounded width—i.e., requiring only a fixed amount of resources—while preserving functionality [BDH+12, 2.1.1].

Depending on subsystem origins and packaging, some of the submodule hierarchy may easily be integrated into smaller hash trees and allow graph reduction already during graph construction, reducing the size of some sub-graphs [BDPVA13, 2.1]. Certain existing attestation tools can already accommodate comparable techniques [Tru11, 29.6].

2.1.8 Examples

Here we briefly discuss the expected representation of asynchronously completing, unrelated subsystems. Assume that three unrelated parallel subsystems may report their configurations (call them C0, C1, C2), but completion order is not deterministic.

We merge such completion as an aggregate hash H documenting three subsystems, and a normalized representation of the list of three hashes. (Assuming a cryptographic hash function, simply sorting the hashes as raw binary values is sufficient as "normalization.") We also introduce a collation component—either software, or possibly small self-contained hardware—which is a simple queue. As subsystems terminate, they simply register their configurations, which the collator stores reliably, tolerating parallel additions to its queue.

When all expected submodules have reported their configurations, the collator reconstructs an aggregate hash by combining any metadata with the received hashes, after organizing queue entries.

As touched above, hierarchical decomposition may prevent combinatorial explosion of the number of accepted hashes, even in the presence of multiple accepted configurations. In our example, three unrelated subsystems report their configurations, and we expect each of them to be in one of two accepted states (as an example, A0 or B0 for the first subsystem). It can easily be realized that we effectively describe 23 accepted configurations ((A0, A1, A2), (A0, A1, B2), . . . (B0, B1, B2)) by a combination of asynchronous completion, sequential dependencies, and choices. Namely:

Three choices, each accepting one of two valid combinations: (A0 or B0), (A1 or B1), (A2 or B2), respectively. Each choice produces a single choice-derived configuration when it matches one of its expected subsystem states, such as H0=H(choice/2, A0, B0) generating a known value if and only if its input is A0 or B0;

Asynchronous completion of three inputs, aggregating choice-derived configurations H0, H1 and H2;

Asynchronous completion depends on the three choices, evaluating configuration when all of them terminated, regardless of the arrival order of H0, H1 and H2. Combined and normalized asynchronous-completion result only matches expected value H(3, H0, H1, H2) if all three choices were in a recognized state, regardless of actual completion order. Since the choices hide the actual result—reporting only if it was an expected one, and the set it was expected from—our single aggregate hash will match any of the expected 23 variations of A0 . . . B2, and no other configuration. A naïve implementation would attempt to track 23 alternative configurations, in a similar scenario, which, clearly, can be a lot more difficult, computationally speaking, even in systems of modest size if other choices are also present.

2.1.9 Related Work

Dependency resolution based on developer-contributed metadata may easily be utilized by implementations, such as custom attributes are available in packaging formats. Most practically used package management schemes (especially interesting for free and open-source software distribution services) use metadata in suitably expandable form [TZ09, 1.1].

Present systems rely on offline construction of configuration information, outside resource-constrained environments, we can optimize the process by mandating formats which are parsable in a single pass even by embedded environments. We mandate storage formats where the embedded component may verify integrity and actual resource consumption based on compiler-generated hints, biasing the system strongly towards offline complexity and online simplicity. At the same time, present systems allows cross-checking by the embedded parser, even if we assume a reliable compiler (but we can still recognize if compiled constructs' annotations are insecure). The present systems may therefore use techniques shared by similar systems, where a small, security-critical component needs to safely verify the results of offline construction, the latter originating in a resource-rich, potentially untrusted environment [YSD+09, 1.1, 2.3].

Cryptographic hashes are widely used to track source code, binary executable or entire packages [McG07, "Unique build id"]. We assume implementations to inherit much of the necessary infrastructure from libraries.

2.1.10 References

[BBD+12] George Bosilca, Aurelien Bouteiller, Anthony Danalis, Thomas Herault, Pierre Lemarinier, and Jack Dongarra. DAGuE: A generic distributed DAG engine for high performance computing. Parallel Computing, 38(1-2):37-51, 2012.

[BDH+12] Grey Ballard, James Demmel, Olga Holtz, Benjamin Lipshitz, and Oded Schwartz. Graph expansion analysis for communication costs of fast rectangular matrix multiplication. Technical Report UCB/EECS-2012-194, EECS Department, University of California, Berkeley, September 2012.

[BDPVA13] Guido Bertoni, Joan Daemen, Michael Peeters, and Gilles Van Assche. Sakura: a flexible coding for tree hashing. Cryptology ePrint Archive, Report 2013/231, 2013. eprint.iaer.org/2013/231.

[Bla06] John Black. Compare-by-hash: A reasoned analysis. In USENIX Annual Technical Conference, General Track, pages 85-90, 2006.

[Cor10] Jonathan Corbet. The road forward for systemd. Online at lwn.net/Articles/389149, May 2010 [accessed 2013-11-15].

[Don13] Jack Dongarra. Architecture-aware algorithms and software for peta and exascale computing, November 2013. Presentation at Supercomputing 2013 (SC13) (Denver, Colo.).

[FIP01] National Institute of Standards and Technology (NIST). Federal Information Processing Standard: Security Requirements for Cryptographic Modules (FIPS 140-2), 2001.

[ISO06] ISO/IEC 23360-1:2006, Linux Standard Base (LSB) core specification 3.1—Part 1: Generic specification, December 2006.

[Mah05] Ziga Mahkovec. Bootchart—boot process performance visualization. Online at bootchart.org, 2005 [accessed 2013-11-21].

[McG07] Roland McGrath. Fedora project: add buildid support. Online at fedoraproject.orgwiki/Releases/FeatureBuildId, October 2007 [accessed 2013-11-18].

[PSL12] Lennart Poettering, Kay Sievers, and Thorsten Leemhuis. Control centre: The systemd Linux init system. Online at h-online.com/-1565543, May 2012 [accessed 2013-11-17].

[RCK+09] Leonid Ryzhyk, Peter Chubb, Ihor Kuz, Etienne Le Sueur, and Gernot Heiser. Automatic device driver synthesis with termite. In Jeanna Neefe Matthews and Thomas E. Anderson, editors, Proceedings of the 22nd ACM Symposium on Operating Systems Principles (SOSP) 2009, pages 73-86. ACM, 2009.

[Saf13] David Safford. Embedded Linux integrity. In Proceedings of the Linux Security Summit (LSS 2013), June 2013.

[Tru11] Trusted Computing Group. Trusted Platform Module (TPM) Specification, Part 1: Design principles (v1.2, revision 116), March 2011.

[TZ09] Ralf Treinen and Stefano Zacchiroli. Expressing advanced user preferences in component installation. In Proceedings of IWOCE'2009: 1st international workshop on Open component ecosystems, September 2009.

[YSD+09] Bennet Yee, David Sehr, Greg Dardyk, Brad Chen, Robert Muth, Tavis Ormandy, Shiki Okasaka, Neha Narula, and Nicholas Fullagar. Native client: A sandbox for portable, untrusted x86 native code. In IEEE Symposium on Security and Privacy (Oakland'09), IEEE, 3 Park Avenue, 17th Floor, New York, NY 10016, 2009.

2.2 Computerized System, Hardware and Software

Computerized devices can be suitably designed for implementing embodiments as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments can be implemented wherein general-purpose digital computers, such as personal computers, workstations, etc., are used.

For instance, the system 100 depicted in FIG. 1 schematically represents a computerized unit 101, e.g., a general-purpose computer. In exemplary embodiments, in terms of hardware architecture, as shown in FIG. 1, the unit 101 includes a processor 105, memory 110 coupled to a memory controller 115, and one or more input and/or output (I/O) devices 20, 150, 155 (or peripherals) that are communicatively coupled via a local input/output controller 135. The input/output controller 135 can be, but is not limited to, one or more buses or other wired or wireless connections, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, software in the memory 110, such as the runtime (or a reporting) environment, includes methods described herein in accordance with exemplary embodiments and a suitable operating system (OS), if needed, although many of the operations discussed herein shall likely be performed before loading an OS, as per the nature of the module startup herein. Note that the present methods may include hardware checking components, then components checking firmware, and then the OS.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 20 may be present. The system 100 can further include a display controller 125 coupled to a display 130. In exemplary embodiments, the system 100 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS) or the like. The BIOS is stored in ROM so that the BIOS can be executed when the computer 101 is activated. Note that the BIOS could be involved in the present methods. As an example, firmware setup may be needed to boot from an USB disk (or even in a simpler case: connecting an USB keyboard may need USB/firmware support before an OS appears).

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. Note, however, that low-level parts (e.g., related to trusted boot) would be typically in C or other native language. The program code may execute entirely on the unit 101, partly thereon, partly on a unit 101 and another unit 101, similar or not. It may execute partly on a user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Should embodiments involve collecting user's data or otherwise sensitive data, at least some embodiments can be contemplated wherein sensitive data need not be permanently stored, or are stored such as to meet any legal provision and/or ethic requirement as applicable.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, to obtain a new combination of features (not explicitly recited herein) that nevertheless remains within the scope of the present invention, especially where such a new combination would provide an advantage recited in the present description and, this, notwithstanding the particular technical contexts in which the features constituting this new combination may have been described, e.g., for the mere sake of illustration, and provided that such a new combination makes sense for the one skilled in the art, in view of other elements described in the present application, such as advantages provided by the features described herein. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, other types of control nodes and corresponding structures may be contemplated. Similarly, a connected pair of control nodes could be aggregated into a single, complex control node, etc.

The invention claimed is:

1. A computer-implemented method, the method comprising:
   starting a module of a computerized system at least by:
      receiving graph data of a direct acyclic graph, or DAG, describing said module by way of nodes connected by edges, wherein:
         at least part of the nodes are submodule nodes that correspond to submodules of said module, respectively;
         the submodule nodes are connected via one or more edges of the edges that reflect a data dependency between the corresponding submodules; and
         each of said submodules is a hardware submodule or a software submodule, capable of producing and/or consuming data that can, in turn, be consumed and/or produced, respectively, by one or more other submodules of said module, consistently with the edges of the DAG;
      starting asynchronous execution of two of said submodules, respectively corresponding to two submodule nodes of the submodule nodes located in independent branches of the DAG,
      determining at least a third submodule node of the submodule nodes that is a descendant of each of said two submodule nodes, according to an outcome of execution of one or each of corresponding two submodules, and starting execution of a third submodule that corresponds to the third submodule node determined, in view of completing the starting of said module,
   wherein the DAG further comprises one or more control nodes, which correspond to control structures and connect, each, directly or not, one or more first submodule nodes to one or more second submodule nodes that are descendant of said first submodule nodes,
   wherein the determining at least the third submodule comprises: checking an outcome of execution of at least one of said two submodules by executing a control structure corresponding to a control node connecting one or each node corresponding to one or each of said two submodules, respectively, to said third submodule node, wherein the one or more control nodes comprises each of multiple values, for checking multiple potential outcomes of execution of one or more of the ancestor submodule nodes of each of the one or more control nodes, and wherein the one or more control nodes comprise at least one choice control node, having two or more ancestor submodule nodes, wherein only one of the corresponding submodules is selected to be executed at runtime, said choice control node comprising or aggregating the multiple values, for checking multiple potential outcomes of execution of any of said two or more ancestor submodule nodes of said one choice control node.

2. The method of claim 1, wherein the execution of the third submodule is started asynchronously with execution of a fourth submodule, wherein the latter is selected to be executed as a choice among a set of submodules at runtime, and wherein the third submodule and the fourth submodule respectively correspond to two submodule nodes located in the independent branches of the DAG, the method further comprising:

determining at least one fifth submodule node that is a descendant of the two submodule nodes that correspond to said third and fourth submodules, according to an outcome of execution of one or each of said third and fourth submodules; and starting execution of the fifth submodule, in view of completing the starting of said module.

3. The method of claim 1, wherein the determining at least the third submodule node is performed according to both:
an outcome of execution of one or each of said two submodules; and
an outcome of a step of the checking the outcome of the execution of at least one of said two submodules.

4. The method of claim 1, wherein said one or more control nodes aggregate each of said multiple values into a single value, which value is high-assurance configuration identifier comprising a single hash value.

5. The method of claim 1, wherein the one or more control nodes comprises at least one asynchronous completion control node, having two or more ancestor submodule nodes, wherein a corresponding control structure requires, upon execution, asynchronous completion of said two or more ancestor submodule nodes.

6. The method of claim 1, further comprising:
using the DAG to collect information as to the starting of the computerized system as it progresses, whereby values are computed that correspond to an intermediate or a final configuration, as obtained once part or all submodules of the module have been executed; and
logging the computed values, in a form suitable for high-assurance system auditing.

7. The method of claim 6, further comprising:
comparing the computed values to expected values as computed at build-time.

8. The method of claim 1, further comprising: at build-time, using a known description of said module of the computerized system to create said graph data of the DAG and computing expected values corresponding to an intermediate and/or a final configuration of the computerized system as expected to be obtained once part or all submodules of the module have been executed, by traversing the DAG.

9. A computerized system comprising:
at least one hardware module or software module; and
at least one hardware processor and at least one memory comprising computer readable code, the at least one hardware processor configured by the computer readable code to create a run-time environment equipped with computerized methods designed for implementing at least the following:

starting a module of a computerized system at least by:
receiving graph data of a direct acyclic graph, or DAG, describing said module by way of nodes connected by edges, wherein:
at least part of the nodes are submodule nodes that correspond to submodules of said module, respectively;
the submodule nodes are connected via one or more edges of the edges that reflect a data dependency between the corresponding submodules; and
each of said submodules is a hardware submodule or a software submodule, capable of producing and/or consuming data that can, in turn, be consumed and/or produced, respectively, by one or more other submodules of said module, consistently with the edges of the DAG;

starting asynchronous execution of two of said submodules, respectively corresponding to two submodule nodes of the submodule nodes located in independent branches of the DAG, determining at least a third submodule node of the submodule nodes that is a descendant of each of said two submodule nodes, according to an outcome of execution of one or each of corresponding two submodules, and starting execution of a third submodule that corresponds to the third submodule node determined, in view of completing the starting of said module, wherein said at least one hardware module or software module comprises several submodules that are, each, a hardware module and/or software submodule, capable of producing and/or consuming data that can, in turn, be consumed and/or produced, respectively, by one or more other submodules of said module, consistently with edges of the DAG, wherein the DAG further comprises one or more control nodes, which correspond to control structures and connect, each, directly or not, one or more first submodule nodes to one or more second submodule nodes that are descendant of said first submodule nodes, wherein the determining at least the third submodule comprises: checking an outcome of execution of at least one of said two submodules by executing a control structure corresponding to a control node connecting one or each node corresponding to one or each of said two submodules, respectively, to said third submodule node, wherein the one or more control nodes comprises each of multiple values, for checking multiple potential outcomes of execution of one or more of the ancestor submodule nodes of each of the one or more control nodes, and wherein the one or more control nodes comprise at least one choice control node, having two or more ancestor submodule nodes, wherein only one of the corresponding submodules is selected to be executed at runtime, said choice control node comprising or aggregating the multiple values, for checking multiple potential outcomes of execution of any of said two or more ancestor submodule nodes of said one choice control node.

10. The computerized system of claim 9, further comprising a reporting environment configured for using the DAG to collect information as to the starting of the computerized system as it progresses and logging the collected information, in a form suitable for high-assurance system auditing.

11. The computerized system of claim 9, wherein the execution of the third submodule is started asynchronously with execution of a fourth submodule, wherein the latter is selected to be executed as a choice among a set of submodules at runtime, and wherein the third submodule and the fourth submodule respectively correspond to two submodule nodes located in the independent branches of the DAG, wherein the at least one hardware processor is further configured by the computer readable code to cause the run-time environment to perform the following:
   determining at least one fifth submodule node that is a descendant of the two submodule nodes that correspond to said third and fourth submodules, according to an outcome of execution of one or each of said third and fourth submodules; and
   starting execution of the fifth submodule, in view of completing the starting of said module.

12. The computerized system of claim 9, wherein the determining at least the third submodule node is performed according to both:
   an outcome of execution of one or each of said two submodules; and
   an outcome of a step of the checking the outcome of the execution of at least one of said two submodules.

13. The computerized system of claim 9, wherein the at least one hardware processor is further configured by the computer readable code to cause the run-time environment, at build-time, to perform using a known description of said module of the computerized system to create said graph data of the DAG and computing expected values corresponding to an intermediate and/or a final configuration of the computerized system as expected to be obtained once part or all submodules of the module have been executed, by traversing the DAG.

14. A computer-program product, comprising a non-transitory computer readable medium comprising computer program code, which when executed by a hardware processor of a computer causes the computer to implement the method of claim 1.

15. A computer-implemented method, the method comprising:
   starting a module of a computerized system at least by:
      receiving graph data of a direct acyclic graph, or DAG, describing said module by way of nodes connected by edges, wherein:
         at least part of the nodes are submodule nodes that correspond to submodules of said module, respectively;
         the submodule nodes are connected via one or more edges of the edges that reflect a data dependency between the corresponding submodules; and
         each of said submodules is a hardware submodule or a software submodule, capable of producing and/or consuming data that can, in turn, be consumed and/or produced, respectively, by one or more other submodules of said module, consistently with the edges of the DAG;
      starting asynchronous execution of two of said submodules, respectively corresponding to two submodule nodes of the submodule nodes located in independent branches of the DAG,
      determining at least a third submodule node of the submodule nodes that is a descendant of each of said two submodule nodes, according to an outcome of execution of one or each of corresponding two submodules, and starting execution of a third submodule that corresponds to the third submodule node determined, in view of completing the starting of said module,
   wherein the DAG further comprises one or more control nodes, which correspond to control structures and connect, each, directly or not, one or more first submodule nodes to one or more second submodule nodes that are descendant of said first submodule nodes,
   wherein the determining at least the third submodule comprises: checking an outcome of execution of at least one of said two submodules by executing a control structure corresponding to a control node connecting one or each node corresponding to one or each of said two submodules, respectively, to said third submodule node,
   wherein the one or more control nodes comprises each of multiple values, for checking multiple potential outcomes of execution of one or more of the ancestor submodule nodes of each of the one or more control nodes, and
   wherein the one or more control nodes comprises at least one asynchronous completion control node, having two or more ancestor submodule nodes, wherein a corresponding control structure requires, upon execution, asynchronous completion of said two or more ancestor submodule nodes.

16. The method of claim 15, further comprising: at build-time, using a known description of said module of the computerized system to create said graph data of the DAG and computing expected values corresponding to an intermediate and/or a final configuration of the computerized system as expected to be obtained once part or all submodules of the module have been executed, by traversing the DAG.

17. The method of claim 15, wherein the one or more control nodes comprises at least one choice control node, having two or more ancestor submodule nodes, wherein only one of the corresponding submodules is selected to be executed at runtime, said choice control node comprising or aggregating multiple values, for checking multiple potential outcomes of execution of any of said two or more ancestor submodule nodes of said one choice control node.

18. The method of claim 15, wherein the determining at least the third submodule node is performed according to both:
   an outcome of execution of one or each of said two submodules; and
   an outcome of a step of the checking the outcome of the execution of at least one of said two submodules.

19. The method of claim 15, wherein said one or more control nodes aggregate each of said multiple values into a single value, which value is high-assurance configuration identifier comprising a single hash value.

20. A computer-program product, comprising a non-transitory computer readable medium comprising computer program code, which when executed by a hardware processor of a computer causes the computer to implement the method of claim 15.

* * * * *